(12) United States Patent
Deguchi et al.

(10) Patent No.: US 12,461,173 B2
(45) Date of Patent: Nov. 4, 2025

(54) DIAMOND MAGNETO-OPTICAL SENSOR

(71) Applicant: SUMITOMO ELECTRIC INDUSTRIES, LTD., Osaka (JP)

(72) Inventors: Hiroshige Deguchi, Kyoto (JP); Natsuo Tatsumi, Kyoto (JP); Tsukasa Hayashi, Kyoto (JP); Yoshiki Nishibayashi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 157 days.

(21) Appl. No.: 18/283,940

(22) PCT Filed: Mar. 29, 2022

(86) PCT No.: PCT/JP2022/015394
§ 371 (c)(1),
(2) Date: Sep. 25, 2023

(87) PCT Pub. No.: WO2022/210696
PCT Pub. Date: Oct. 6, 2022

(65) Prior Publication Data
US 2024/0168107 A1 May 23, 2024

(30) Foreign Application Priority Data
Mar. 31, 2021 (JP) .................. 2021-059796

(51) Int. Cl.
*G01R 33/032* (2006.01)
*G01R 33/00* (2006.01)
(52) U.S. Cl.
CPC ....... *G01R 33/032* (2013.01); *G01R 33/0023* (2013.01)

(58) Field of Classification Search
CPC .............. G01R 33/032; G01R 33/0023; G01R 33/3628; G01R 33/26; G01N 24/10
(Continued)

(56) References Cited

U.S. PATENT DOCUMENTS

| 4,760,400 A | 7/1988 | Lait |
| 6,084,410 A * | 7/2000 | Nistler ............... G01R 33/3628 324/318 |

(Continued)

FOREIGN PATENT DOCUMENTS

| JP | 52-54349 A | 5/1977 |
| JP | 2000-114870 A | 4/2000 |

(Continued)

OTHER PUBLICATIONS

Jia, Wenfei, et al. "Ultra-broadband coplanar waveguide for optically detected magnetic resonance of nitrogen-vacancy centers in diamond." Review of Scientific Instruments 89.6 (2018). (Year: 2018).*

(Continued)

*Primary Examiner* — Christopher P Mcandrew
(74) *Attorney, Agent, or Firm* — Renner, Otto, Boisselle & Sklar, LLP

(57) ABSTRACT

A diamond magneto-optical sensor includes: a diamond including a color center with an electronic spin, a transmission circuit that transmits electromagnetic waves, and an irradiation unit that irradiates the diamond with electromagnetic waves transmitted by the transmission circuit, wherein the transmission circuit includes an impedance converter that reduces or increases, with respect to the irradiation unit, the impedance of an electromagnetic source for outputting electromagnetic waves.

18 Claims, 11 Drawing Sheets

(58) Field of Classification Search
USPC .................................................. 324/244.1
See application file for complete search history.

(56) References Cited

U.S. PATENT DOCUMENTS

| | | | | |
|---|---|---|---|---|
| 6,380,742 | B1 * | 4/2002 | Stringer | G01R 33/3628 |
| | | | | 324/318 |
| 6,833,704 | B1 * | 12/2004 | Murphy | G01R 33/3628 |
| | | | | 324/318 |
| 2002/0013525 | A1 * | 1/2002 | Scott | G01R 33/285 |
| | | | | 600/410 |
| 2004/0024308 | A1 * | 2/2004 | Wickline | G01R 33/285 |
| | | | | 600/422 |
| 2004/0030242 | A1 * | 2/2004 | Weber | G01R 33/285 |
| | | | | 324/322 |
| 2005/0251031 | A1 * | 11/2005 | Smith | G01R 33/3628 |
| | | | | 600/433 |
| 2008/0136416 | A1 * | 6/2008 | Goetz | G01R 33/34046 |
| | | | | 324/322 |
| 2018/0275209 | A1 | 9/2018 | Mandeville et al. | |

FOREIGN PATENT DOCUMENTS

| | | |
|---|---|---|
| JP | 2000-124713 A | 4/2000 |
| JP | 2004-163859 A | 6/2004 |
| JP | 2019-53025 A | 4/2019 |
| JP | 2020-134415 A | 8/2020 |
| WO | 2009/107681 A1 | 9/2009 |

OTHER PUBLICATIONS

Yuta Masuyama, Yuji Hatano, Takayuki Iwasaki, Mutsuko Hatano, "Highly sensitive macro-scale diamond magnetometer operated with coplanar waveguide resonator", the 79th JSAP Autumn Meeting Extended Abstracts (issued on Sep. 5, 2018) (cited in specification).

Jia, et al., "Ultrabroadband coplanar waveguide for optically detected magnetic resonance of nitrogen-vacancy centers in diamond", Review of scientific instruments, American institute of physics, vol. 89, No. 6, Jun. 14, 2018, pp. 064705-1-064705-5.

Zhang, et al., "Microwave Magnetic Field Coupling with Nitrogen-Vacancy Center Ensembles in Diamond with High Homogeneity", Applied Magnetic Resonance, vol. 47, No. 6, Apr. 19, 2016, pp. 589-599.

Bayat, et al., "Efficient Uniform, and Large Area Microwave Magnetic Coupling to NV Centers in Diamond Using Double Split-Ring Resonators", Nano Letters, vol. 14, No. 3, Mar. 3, 2014, pp. 1208-1213.

Ma, et al., "Efficient microwave radiation using broadened-bandwidth coplanar waveguide resonator on assembly of nitrogen-vacancy centers in diamond", Japanese Journal of Applied Physics, vol. 58, No. 5, May 1, 2019, pp. 050919-1-050919-6.

* cited by examiner

DIAMOND MAGNETO-OPTICAL SENSOR

TECHNICAL FIELD

The present disclosure relates to a diamond magneto-optical sensor. The present application claims priority under Japanese Patent Application No. 2021-059796 filed on Mar. 31, 2021, which is incorporated herein by reference.

BACKGROUND ART

A magneto-optical sensor using the center of NV (hereinafter referred to as a NV center) in diamond is known. When nitrogen at a substitution position of carbon in diamond and an NV center having a vacancy next to the nitrogen are negatively charged, the ground state becomes a triplet state (that is, a spin S=1). The NV center excited at a wavelength 532 nm (that is, green light) emits fluorescence at a wavelength 637 nm (that is, red light). The radiant intensity of fluorescence changes according to a spin state. The spin state is changed by magnetic resonance occurring due to a magnetic field applied to the NV center and microwaves or radio waves, which is applicable to a diamond magneto-optical sensor.

A diamond magneto-optical sensor includes a diamond substrate containing an NV center, an optical system that transmits excitation light from a light source and emits the light to the NV center, an optical system that condenses fluorescence from the NV center and transmits the fluorescence to a photodetector, and a waveguide that transmits microwaves from a power supply and emits the microwaves to the NV center.

For example, NPL 1 discloses a configuration for emitting microwaves with a diamond sensor placed on a coplanar waveguide. A diamond substrate is shaped like a rectangular solid. Excitation light is laterally emitted to the diamond substrate, and fluorescence is condensed from a position above the diamond substrate.

CITATION LIST

Non Patent Literature

NPL 1: "Highly sensitive macro-scale diamond magnetometer operated with coplanar waveguide resonator", Yuta Masuyama, Yuji Hatano, Takayuki Iwasaki, Mutsuko Hatano, the 79th JSAP Autumn Meeting Extended Abstracts (issued on Sep. 5, 2018)

SUMMARY OF INVENTION

Solution to Problem

A diamond magneto-optical sensor according to an aspect of the present disclosure includes: a diamond including a color center with an electronic spin, a transmission circuit that transmits electromagnetic waves, and an irradiation unit that irradiates the diamond with electromagnetic waves transmitted by the transmission circuit, wherein the transmission circuit includes an impedance converter that reduces or increases, with respect to the irradiation unit, the impedance of an electromagnetic source for outputting electromagnetic waves.

A diamond magneto-optical sensor according to another aspect of the present disclosure includes: a diamond including a color center with an electronic spin, a transmission circuit that transmits electromagnetic waves, and an irradiation unit that irradiates the diamond with electromagnetic waves transmitted by the transmission circuit, wherein the transmission circuit includes a resonator.

DETAILED DESCRIPTION

Figure 1:
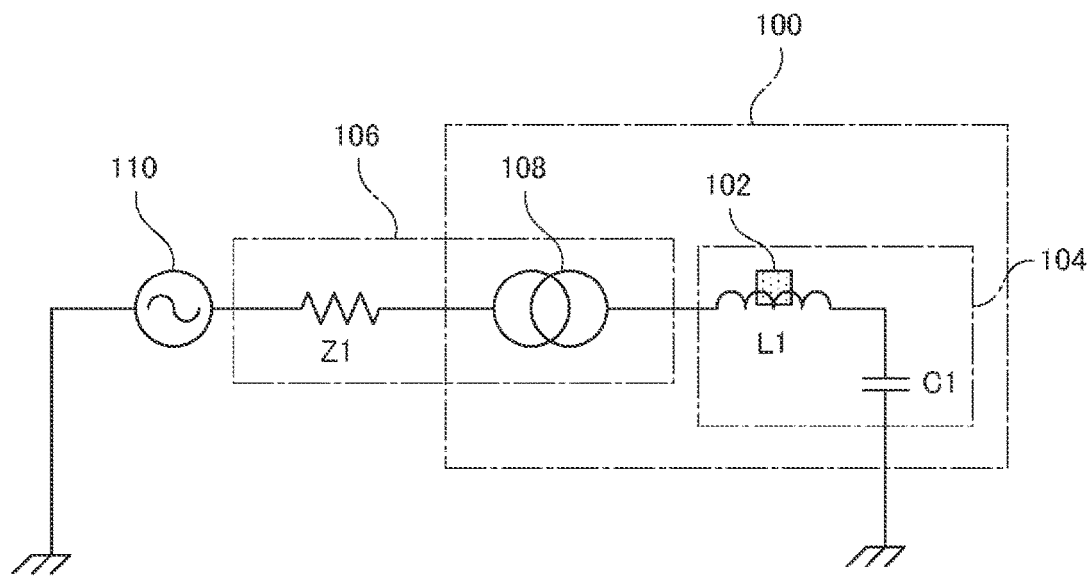
FIG. 1 is a circuit diagram illustrating a diamond magneto-optical sensor according to a first embodiment of the present disclosure.

Problem to be Solved by the Present Disclosure

According to NPL 1, microwaves from a power supply were transmitted to an NV center through a coplanar waveguide and were subjected to magnetic resonance, proving that sufficient magnetic resonance needs microwaves supplied with a power of about 30 dBm (=1 W). Also in the use of a microstrip line, microwaves need to be supplied with substantially the same power.

The frequency of microwaves for the magnetic resonance of the NV center is about 3 GHz. This frequency changes depending upon a magnetic field, an electric field, and a temperature. Coefficients representing the effects of these factors (that is, fluctuations in resonance frequency) are shown below.

The effect of a magnetic field: 28 GHz/T
The effect of an electric field: 17 Hz/(V/cm)
The effect of a temperature: −74.2 kHz/K Thus, if microwaves for the magnetic resonance of the NV center have high power, a temperature may be raised by a transmission loss of microwaves around a diamond including the NV center and affect the frequency of magnetic resonance, resulting in adverse effect on measurement. For this reason, magnetic resonance is desirably produced with microwaves at the minimum power.

If a diamond magneto-optical sensor is used for measurement in a high-voltage power unit, it is desirable to transmit excitation light, fluorescence, and microwaves while remotely ensuring electrical insulation to avoid high-voltage electrical breakdown. Excitation light and fluorescence can be transmitted through an optical fiber while remotely ensuring electrical insulation. In the transmission of microwaves through a coaxial cable, electrical insulation is hard to obtain. Spatial transmission by radio waves through a transmitting antenna and a receiving antenna can remotely ensure electrical insulation. In the case of spatial transmission of microwaves through a transmitting antenna and a receiving antenna, power-saving transmission with a compact size and low cost is preferable. In other words, it is desirable to suppress power for transmitting microwaves, increase an antenna gain, and produce magnetic resonance with microwaves at the minimum power.

Thus, an object of the present disclosure is to provide a diamond magneto-optical sensor that is operable with microwaves at low power.

Advantageous Effect of the Present Disclosure

The present disclosure can provide a diamond magneto-optical sensor that is operable with microwaves at low power.

DESCRIPTION OF EMBODIMENTS OF THE PRESENT DISCLOSURE

The contents of embodiments of the present disclosure will be described in list form. At least parts of the embodiments below may be combined as required.

(1) A diamond magneto-optical sensor according to a first aspect of the present disclosure includes: a diamond including a color center with an electronic spin, a transmission circuit that transmits electromagnetic waves, and an irradiation unit that irradiates the diamond with electromagnetic waves transmitted by the transmission circuit, wherein the transmission circuit includes an impedance converter that reduces or increases, with respect to the irradiation unit, the impedance of an electromagnetic source for outputting electromagnetic waves. Thus, the diamond magneto-optical sensor is operable with microwaves at low power.

(2) A diamond magneto-optical sensor according to a second aspect of the present disclosure includes: a diamond including a color center with an electronic spin, a transmission circuit that transmits electromagnetic waves, and an irradiation unit that irradiates the diamond with electromagnetic waves transmitted by the transmission circuit, wherein the transmission circuit includes a resonator. Thus, the diamond magneto-optical sensor is operable with microwaves at low power.

(3) In the diamond magneto-optical sensor according to the second aspect, the transmission circuit may include an impedance converter that reduces or increases, with respect to the irradiation unit, the impedance of an electromagnetic source for outputting electromagnetic waves. This can increase a current passing through a resonator or a voltage applied to the resonator, thereby efficiently irradiating the diamond with electromagnetic waves.

(4) The impedance converter may include a transformer. Thus, the diamond magneto-optical sensor can be easily formed.

(5) The impedance converter may include a $\lambda/4$ transformer. This can accurately convert an impedance between the transmission circuit of electromagnetic waves and the resonator, thereby efficiently irradiating the diamond with electromagnetic waves.

(6) The resonator may include a $\lambda/4$ stub. This can accurately adjust the resonance frequency of the resonator, thereby efficiently irradiating the diamond with electromagnetic waves.

(7) The $\lambda/4$ stub may include a $\lambda/4$ open stub. Thus, the shape of the diamond can be easily designed with high condensing efficiency of fluorescence. Moreover, series resonance can be obtained, a short-circuit current can be increased, and microwaves can be radiated with a stronger magnetic field.

(8) The $\lambda/4$ stub may include a $\lambda/4$ short stub. This can obtain parallel resonance, increase an open-circuit voltage, and radiate microwaves with a stronger magnetic field.

(9) The $\lambda/4$ stub may include two linear electric conductors arranged in parallel. This can increase a magnetic field applied to the diamond by microwaves.

(10) The $\lambda/4$ stub may include four linear electric conductors arranged in parallel. This can increase a magnetic field applied to the diamond by microwaves.

(11) The $\lambda/4$ stub may include two flat-shaped electric conductors, and the two flat-shaped electric conductors may be opposed to each other in parallel. This can increase a magnetic field applied to the diamond by microwaves, thereby improving the uniformity of the magnetic field.

(12) The diamond may be larger than 0 and 0.3 mm or less in thickness, and the two linear electric conductors may be separated from each other in the thickness direction of the diamond interposed between the electric conductors. This can increase a magnetic field applied to the diamond by microwaves.

(13) The diamond may be 0.5 mm or more and 3 mm or less in thickness, and the two flat-shaped electric conductors may be separated from each other in the thickness direction of the diamond interposed between the electric conductors. This can increase a magnetic field applied to the diamond by microwaves, thereby improving the uniformity of the magnetic field.

(14) The λ/4 transformer may be tapered with a continuously changing width. This can easily and accurately convert an impedance on a wide frequency band.

(15) The λ/4 transformer may be formed as a multi-stage transformer with a discretely changing width. This can easily and accurately convert an impedance on a wide frequency band.

(16) The impedance converter may include a microstrip line, and the width of the microstrip line may be half or less of the length of the microstrip line. This can easily and accurately convert an impedance with a small loss.

(17) The width of the λ/4 stub may be half or less of the length of the λ/4 stub. This can produce resonance with a smaller amount of radiation.

(18) The diamond may have the center located in a predetermine range from the connecting end of the λ/4 open stub with the transmission circuit, the predetermined range may be one eighth or more and three eighths or less of the electrical length of the λ/4 open stub, and the length of the diamond may be one fourth or less of the electrical length along the longitudinal direction of the λ/4 open stub. This can increase a magnetic field applied to the diamond by microwaves.

(19) The diamond may have the center located in a predetermine range from the short-circuited end of the λ/4 short stub, the predetermined range may be one eighth or more and three eighths or less of the electrical length of the λ/4 short stub, and the length of the diamond may be one fourth or less of the electrical length along the longitudinal direction of the λ/4 short stub. This can increase a magnetic field applied to the diamond by microwaves.

DETAILED DESCRIPTION OF EMBODIMENTS OF THE PRESENT DISCLOSURE

In the following embodiments, the same components are indicated by the same reference numerals. The same components have identical names and functions. Thus, a detailed explanation thereof is not repeated.

First Embodiment

Referring to FIG. 1, a diamond magneto-optical sensor 100 according to a first embodiment of the present disclosure includes a diamond 102, a resonator 104, a transmission circuit 106, and a microwave source 110. In the present embodiment, microwaves are efficiently supplied to diamond 102 by the resonator composed of a lumped parameter circuit. Diamond 102 includes an NV center.

Resonator 104 includes a coil L1 and a capacitor C1 and constitutes a series resonant circuit. Diamond 102 is disposed near coil L1 (including the interior of coil L1). The interior of coil L1 means a space surrounded by wirings constituting coil U. Resonator 104 is an irradiation unit for irradiating diamond 102 with microwaves. Transmission circuit 106 includes an impedance converter 108 and the coaxial cable of a characteristic impedance Z1 connecting impedance converter 108 and microwave source 110. Microwave source 110 is a power supply that generates microwaves at a predetermined frequency. Characteristic impedance Z1 is, for example, 50Ω. Microwave source 110 supplies electromagnetic waves (that is, microwaves) to diamond magneto-optical sensor 100 through the coaxial cable (that is, 50-Ω feed). Specifically, impedance converter 108 is a transformer. Using a transformer as impedance converter 108 facilitates the formation of the diamond magneto-optical sensor. With this configuration, resonator 104 and impedance converter 108 act as resonators that can increase the magnetic field of microwaves from microwave source 110 and irradiate diamond 102 with the microwaves.

For example, if an impedance is converted such that the turns ratio of the windings of impedance converter 108 is the primary side:the secondary side=1:N (N is a positive rational number), an open-circuit voltage on the load side (that is, an LC series resonator) is multiplied by N, the impedance is multiplied by $N^2$, and a short-circuit current passing through the series resonant circuit is multiplied by 1/N. Thus, even if the power of microwaves outputted from microwave source 110 is lower than that of the prior art, diamond magneto-optical sensor 100 is allowed to act as a magnetic sensor by setting N at a value smaller than 1.

Second Embodiment

Figure 2:
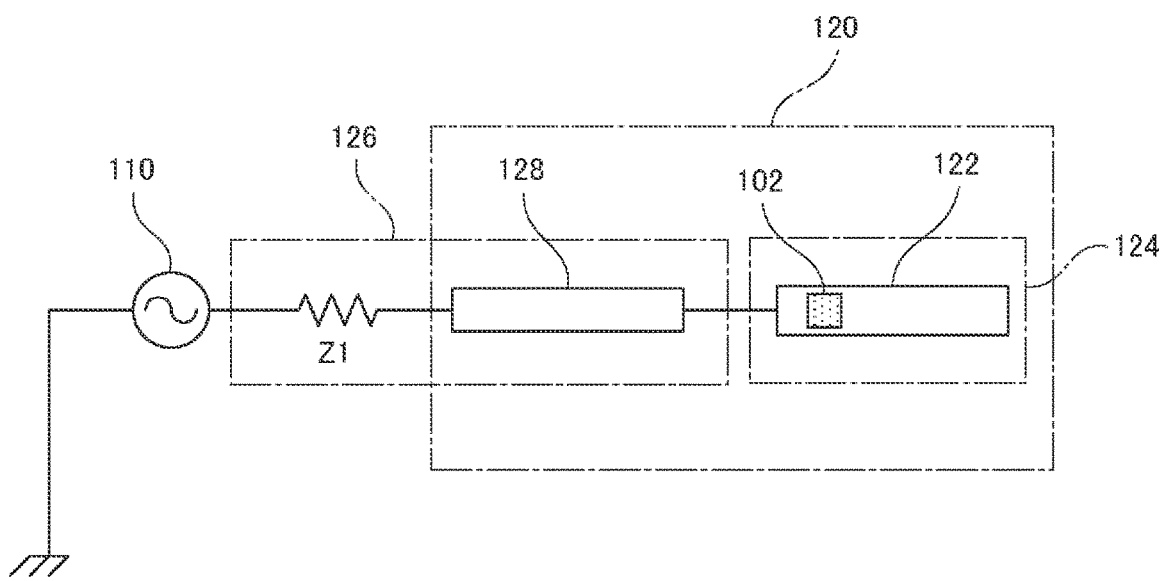
FIG. 2 is a circuit diagram illustrating a diamond magneto-optical sensor according to a second embodiment of the present disclosure.

Referring to FIG. 2, a diamond magneto-optical sensor 120 according to a second embodiment of the present disclosure includes a diamond 102, a resonator 124, a transmission circuit 126, and a microwave source 110. In the present embodiment, microwaves are efficiently supplied to diamond 102 by the resonator composed of a high-frequency circuit.

Resonator 124 includes a λ/4 stub 122 and acts as a series resonant circuit. Diamond 102 is disposed near λ/4 stub 122. Resonator 124 is an irradiation unit for irradiating diamond 102 with microwaves. Transmission circuit 126 includes a λ/4 transformer 128 and the coaxial cable of a characteristic impedance Z1 connecting λ/4 transformer 128 and microwave source 110. Characteristic impedance Z1 is, for example, 50Ω, and microwave source 110 supplies microwaves to diamond magneto-optical sensor 120 through the coaxial cable. λ/4 transformer 128 acts as an impedance converter. λ/4 stub 122 is, for example, a λ/4 open stub. By using λ/4 transformer 128, an impedance can be accurately converted between transmission circuit 126 (specifically, the coaxial cable of characteristic impedance Z1) and the resonator 124, thereby efficiently irradiating diamond 102 with electromagnetic waves.

With this configuration, λ/4 stub 122 and λ/4 transformer 128 act as resonators that can increase the magnetic field of microwaves from microwave source 110 and irradiate diamond 102 with the microwaves. Thus, even if the power of microwaves outputted from microwave source 110 is lower than that of the prior art, diamond magneto-optical sensor 120 is allowed to act as a magnetic sensor.

Figure 3:
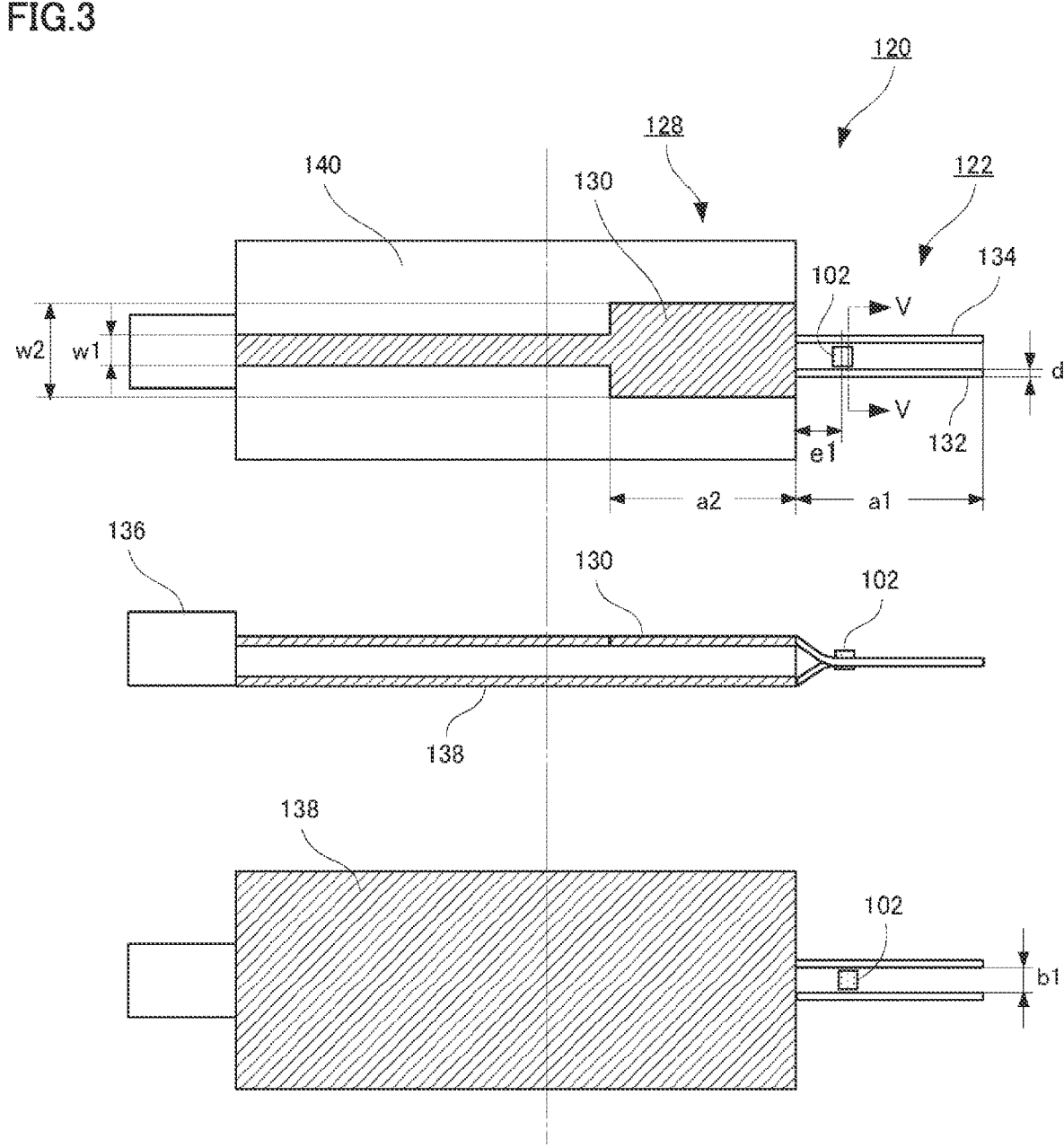
FIG. 3 is a three-view drawing (that is, a plan view, a side view, and a bottom view from the top) illustrating a specific example of the diamond magneto-optical sensor of FIG. 2.

Referring to FIG. 3, the specific configurations of λ/4 stub 122 and λ/4 transformer 128 will be described below. λ/4 stub 122 is formed from two copper wires 132 and 134. Two copper wires 132 and 134 are λ/4 open stubs. Each of copper wires 132 and 134 has a diameter d of 0.45 mm and a length a1 of 20 mm such that λ/4 is obtained for microwaves at about 3 GHz. An interval b1 between copper wires 132 and 134 is 4 mm. Diamond 102 is disposed between copper wires 132 and 134. Copper wires 132 and 134 may be about 50 μm or more and 2 mm or less in diameter. If the diameter is smaller than 50 μm, heat is generated to break the copper wires at the high output of microwaves. If the diameter is larger than 2 mm, the copper wires may be placed out of the transmission circuit and cause an electrical mismatch of the circuit. In the case of this combination (that is, in the use of the copper wires in the diameter range), diamond 102 is preferably 1 μm or more and 0.3 mm or less in thickness.

λ/4 transformer 128 includes a dielectric substrate 140, copper foil 130 disposed on the front side of dielectric substrate 140, and copper foil 138 disposed on the back side of dielectric substrate 140. Dielectric substrate 140 is made of, for example, glass epoxy. Copper foil 130 is connected to copper wire 132. Copper foil 130 includes a first part having a width w1 of 3 mm and a second part having a width w2 of 10 mm. The second part has a length a2 of 20 mm. A receptacle 136 is a SMA receptacle into which the coaxial cable is plugged. The center line (that is, the signal line) of receptacle 136 is connected to copper foil 130 while the ground of receptacle 136 is connected to copper foil 138. Copper foil 138 is connected to copper wire 134.

λ/4 stub 122, which is a λ/4 open stub, has an impedance of, for example, 300Ω. In order to increase a magnetic field applied to diamond 102 by microwaves at the junction of λ/4 transformer 128 having an impedance of 25Ω and λ/4 stub 122, the position of diamond 102 disposed on λ/4 stub 122 is preferably adjusted. A distance e1 from the connecting end of λ/4 stub 122 with transmission circuit 126 (specifically, the λ/4 transformer 128) to the center of diamond 102 is preferably one fourth of the electrical length of λ/4 stub 122 (that is, a λ/4 open stub). The distance e1 may be set in the range (that is one eighth or more and three eighths or less) of (¼)±(⅛) of the electrical length of λ/4 stub 122. Diamond 102 is preferably larger than 0 and 0.3 mm or less in thickness in the direction of the interval b1. The length of diamond 102 is preferably one fourth or less of the electrical length of λ/4 stub 122 along the longitudinal direction of λ/4 stub 122 (that is, a λ/4 open stub). According to the size of diamond 102, a magnetic field applied to diamond 102 by microwaves can be increased as will be described later.

Figure 4:
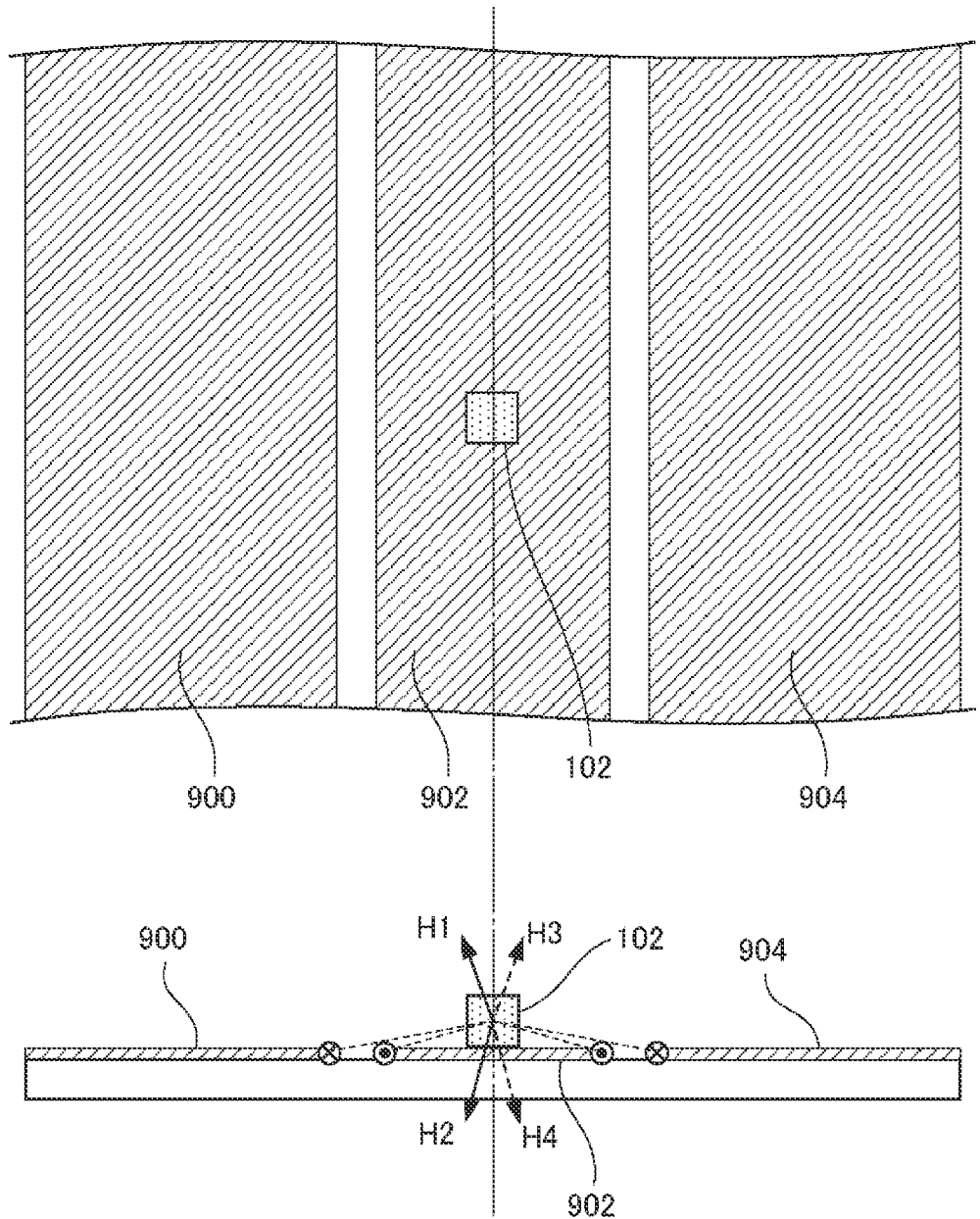
FIG. 4 is a two-view drawing (that is, a plan view and a front view from the top) illustrating a diamond disposed on a coplanar waveguide.
Figure 5:
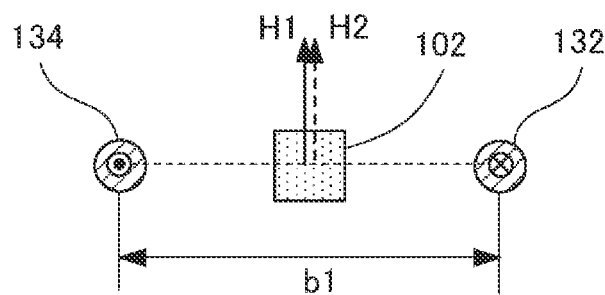
FIG. 5 is a cross-sectional view illustrating a magnetic field formed on the diamond by irradiation of microwaves in the diamond magneto-optical sensor of FIG. 3.

The intensity of microwaves radiated to diamond 102 in this configuration will be examined below. Referring to FIG. 4, if diamond 102 is irradiated with microwaves by using a coplanar waveguide, at a moment when an upward current passes through an electric conductor 902, on which diamond 102 is disposed, in the vertical direction of FIG. 4, a downward current passes through electric conductors 900 and 904 on both sides in the vertical direction of FIG. 4 (see a front view on the lower side). Because of the high-frequency current, a skin effect and a proximity effect concentrate the current on the ends of electric conductors 900, 902, and 904. Thus, in diamond 102, magnetic fields H1 and H2 are formed by an upward current in the vertical direction of FIG. 4 as indicated by solid-line arrows, and magnetic fields H3 and H4 are formed by a downward current in the vertical direction of FIG. 4 as indicated by broken-line arrows. Since these magnetic fields cancel each other, the synthetic magnetic field is small. Referring to FIG. 5, in the configuration of FIG. 3, current passes through copper wires 132 and 134 in opposite directions and forms a magnetic field in diamond 102. The magnetic field increases because magnetic field H1 indicated by the solid-line arrow and magnetic field H2 indicated by the broken-line arrow are generated in the same direction.

As compared with the coplanar waveguide (having an impedance of, for example, 50 S)) in FIG. 4, a short-circuit current is passed by series resonance and thus a substantially doubled current is obtained in the configuration in FIG. 3. Moreover, the short-circuit current is nearly doubled by impedance conversion from 50Ω to 12.5Ω. Thus, a nearly quadrupled current in total passes with microwaves of the same power. For example, the coplanar waveguide forms a magnetic field H at a current 1 A as expressed by H=14.5 (A/m). In contrast, in the configuration of FIG. 3, two copper wires 132 and 134 disposed in parallel with an interval of 4 mm from each other form the magnetic field H at a current 1 A as expressed by H=70 (A/m), which is about five times as large as that of the coplanar waveguide. Thus, the configuration of FIG. 3 can apply, to diamond 102, a magnetic field that is 20 times (=4×5) in total as large as that in the use of the coplanar waveguide of FIG. 4. Thus, even if the power of microwaves outputted from microwave source 110 is lower than that of the prior art, diamond magneto-optical sensor 120 is allowed to act as a magnetic sensor.

Third Embodiment

Figure 6:
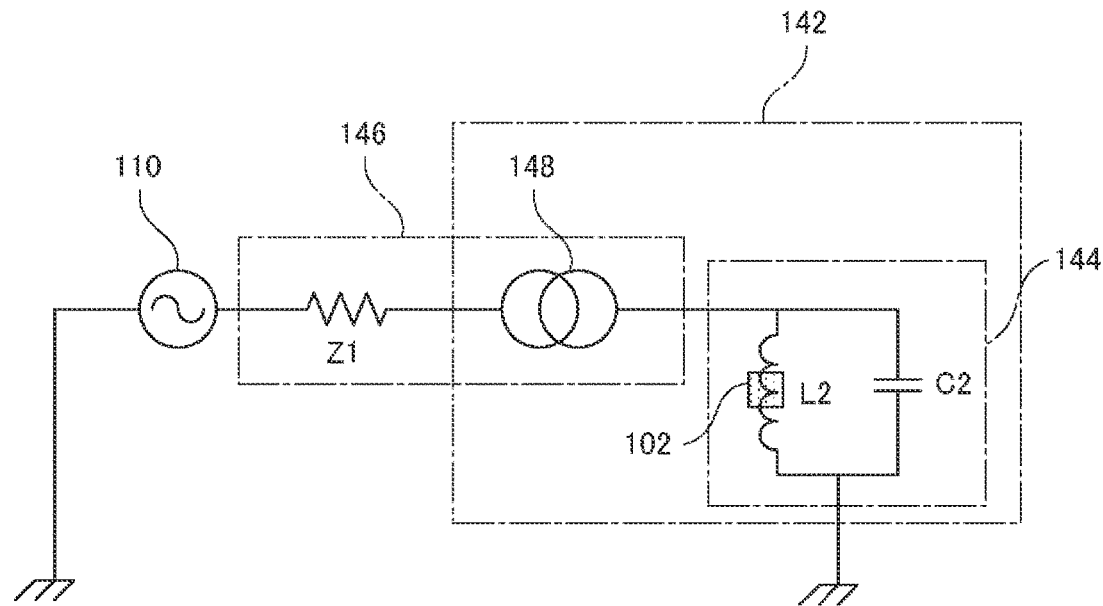
FIG. 6 is a circuit diagram illustrating a diamond magneto-optical sensor according to a third embodiment of the present disclosure.

In the foregoing description, microwaves radiated to diamond 102 are increased by series resonance. The present disclosure is not limited thereto. In a third embodiment, microwaves radiated to a diamond 102 are increased by parallel resonance. Referring to FIG. 6, a diamond magneto-optical sensor 142 according to the third embodiment of the present disclosure includes diamond 102, a resonator 144, a transmission circuit 146, and a microwave source 110. In the present embodiment, microwaves are efficiently supplied to diamond 102 by the resonator composed of a lumped parameter circuit.

The resonator 144 includes a coil L2 and a capacitor C2 and constitutes a parallel resonant circuit. Diamond 102 is disposed near coil L2 (including the interior of coil L2). Resonator 144 is an irradiation unit for irradiating diamond 102 with microwaves. Transmission circuit 146 includes an impedance converter 148 and the coaxial cable of a characteristic impedance Z1 connecting impedance converter 148 and microwave source 110. Characteristic impedance Z1 is, for example, 50Ω. Microwave source 110 supplies microwaves to diamond magneto-optical sensor 142 through the coaxial cable. Specifically, impedance converter 148 is a transformer. Using a transformer as impedance converter 148 facilitates the formation of the diamond magneto-optical sensor. With this configuration, resonator 144 and impedance converter 148 act as resonators that can increase microwaves from microwave source 110 and irradiate diamond 102 with the microwaves.

For example, if an impedance is converted such that the turns ratio of the windings of impedance converter 148 is the primary side:the secondary side=1:N, an open-circuit voltage on the load side (that is, an LC parallel resonator) is multiplied by N. Thus, even if the power of microwaves outputted from microwave source 110 is lower than that of the prior art, diamond magneto-optical sensor 142 is allowed to act as a magnetic sensor.

Fourth Embodiment

Figure 7:
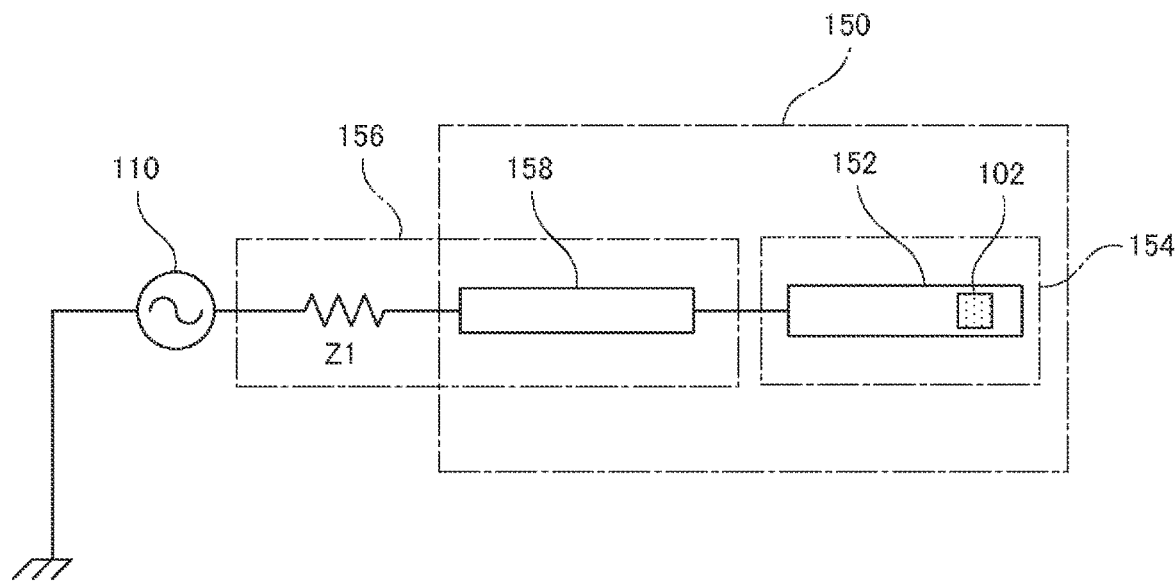
FIG. 7 is a circuit diagram illustrating a diamond magneto-optical sensor according to a fourth embodiment of the present disclosure.

Referring to FIG. 7, a diamond magneto-optical sensor 150 according to a fourth embodiment of the present disclosure includes a diamond 102, a resonator 154, a transmission circuit 156, and a microwave source 110. In the present embodiment, microwaves are efficiently supplied to diamond 102 by the resonator composed of a high-frequency circuit.

Resonator 154 includes a λ/4 stub 152 and acts as a parallel resonant circuit. Diamond 102 is disposed near λ/4 stub 152. Resonator 154 is an irradiation unit for irradiating diamond 102 with microwaves. Transmission circuit 156 includes a λ/4 transformer 158 and the coaxial cable of a characteristic impedance Z1 connecting λ/4 transformer 158 and microwave source 110. Characteristic impedance Z1 is, for example, 50Ω, and microwave source 110 supplies microwaves to diamond magneto-optical sensor 150 through the coaxial cable. λ/4 transformer 158 acts as an impedance converter. λ/4 stub 152 is, for example, a λ/4 short stub. By using λ/4 transformer 158, an impedance can be accurately converted between transmission circuit 156 (specifically, the coaxial cable of characteristic impedance Z1) and resonator 154, thereby efficiently irradiating diamond 102 with electromagnetic waves.

With this configuration, λ/4 stub 152 and λ/4 transformer 158 act as resonators that can increase the magnetic field of microwaves from microwave source 110 and irradiate diamond 102 with the microwaves. Thus, even if the power of microwaves outputted from microwave source 110 is lower than that of the prior art, diamond magneto-optical sensor 150 is allowed to act as a magnetic sensor.

Figure 8:
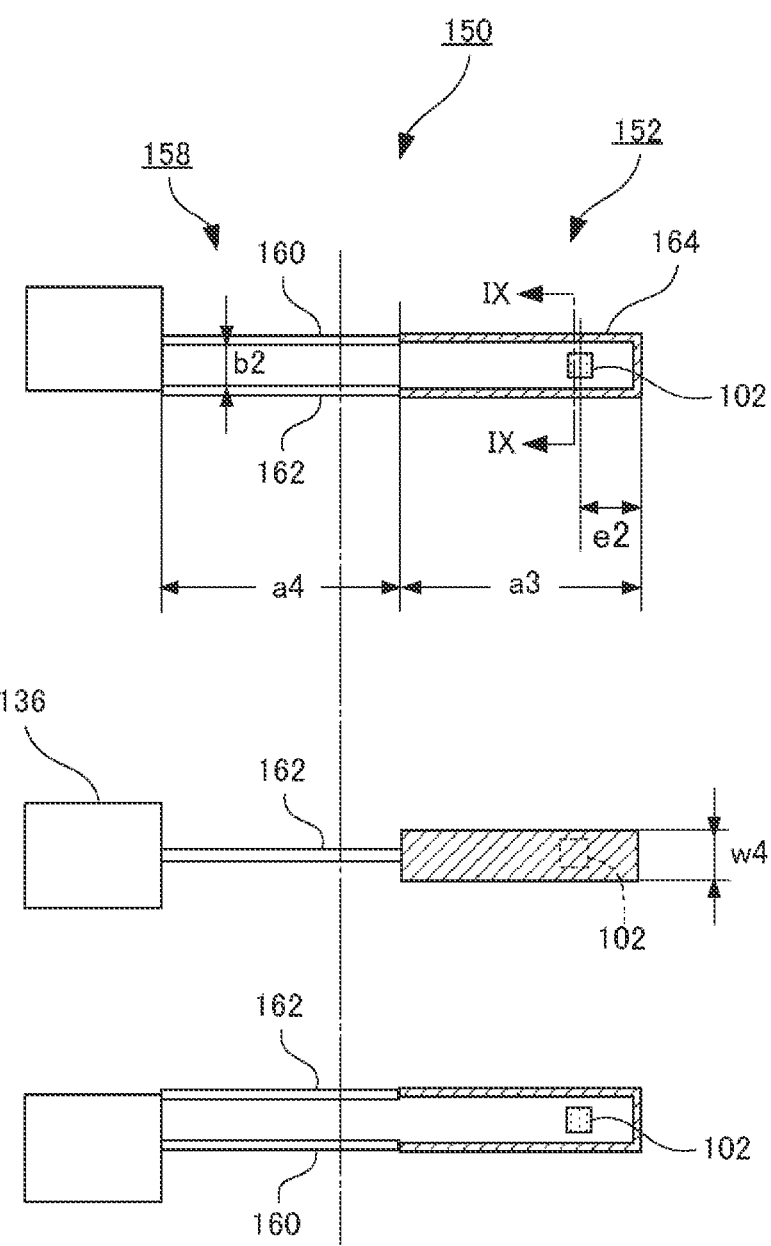
FIG. 8 is a three-view drawing (that is, a plan view, a side view, and a bottom view from the top) illustrating a specific example of the diamond magneto-optical sensor of FIG. 7.

Referring to FIG. 8, the specific configurations of λ/4 stub 152 and λ/4 transformer 158 will be described below. λ/4 stub 152 is formed from flat-shaped copper foil 164. Copper foil 164 is folded into a rectangular shape with one side removed such that a width w4 is 4 mm and a length a3 is 20 mm. Specifically, copper foil 164 is configured such that the two λ/4 stubs are short-circuited at the bended portion of copper foil 164 (hereinafter the bended portion will be referred to as a short-circuited end). λ/4 stub 152 is λ/4 short stub. The width w4 of λ/4 stub 152 is not limited to the above-mentioned value. The width w4 of λ/4 stub 152 may be a half or less of length a3 of λ/4 stub 152. This can produce resonance with a smaller amount of radiation.

λ/4 transformer 158 is connected to copper foil 164 and is formed from two copper wires 160 and 162 arranged in parallel. A length a4 of copper wires 160 and 162 is 20 mm, and an interval b2 therebetween is 4 mm. A receptacle 136 is a SMA receptacle into which the coaxial cable is plugged. The center line (that is, the signal line) of receptacle 136 is connected to copper wire 160 while the ground of receptacle 136 is connected to copper wire 162. Diamond 102 is disposed in a space surrounded by copper foil 164 (that is, inside copper foil 164).

λ/4 stub 152, which is a βt/4 short stub, has an impedance of, for example, 100Ω. In order to convert an impedance by λ/4 transformer 158 having an impedance of 300Ω and increase a magnetic field applied to diamond 102 by microwaves at the junction of λ/4 transformer 158 and λ/4 stub 152, the position of diamond 102 disposed on λ/4 stub 152 is preferably adjusted. A distance e2 from the short-circuited end of λ/4 stub 152 to the center of diamond 102 is preferably one fourth of the electrical length of λ/4 stub 152 (that is, a λ/4 short stub). Distance e2 may be set in the range (that is one eighth or more and three eighths or less) of (¼)±(⅛) of the electrical length of λ/4 stub 152. The thickness of diamond 102 is preferably 0.5 mm or more and 3 mm or less in a direction orthogonal to λ/4 stub 152 (that is, two flat portions parallel to each other). The length of diamond 102 is preferably one fourth or less of the electrical length of λ/4 stub 152 along the longitudinal direction of λ/4 stub 152 (that is, a λ/4 short stub). According to the size of diamond 102, a magnetic field applied to diamond 102 by microwaves can be increased as will be described later.

Figure 9:
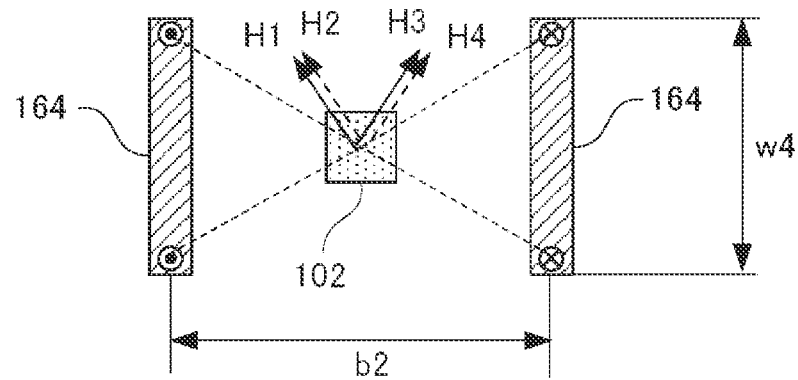
FIG. 9 is a cross-sectional view illustrating a magnetic field formed on a diamond by irradiation of microwaves in the diamond magneto-optical sensor of FIG. 8.

The intensity of microwaves formed on diamond 102 in this configuration will be examined below. As described above, if diamond 102 is irradiated with microwaves by using the coplanar waveguide illustrated in FIG. 4, magnetic fields formed in diamond 102 cancel each other, so that the synthetic magnetic field is small. Referring to FIG. 9, in the configuration of FIG. 8, current passes through copper wire 160 and copper wire 162 in opposite directions, and current passes through the parallel flat portions of copper foil 164 in opposite directions. Because of the high-frequency current, a skin effect and a proximity effect concentrate the current on the end of copper foil 164. A magnetic field formed in diamond 102 by current passing through copper foil 164 increases because magnetic fields H1 and H3 indicated by solid-line arrows and magnetic fields H2 and H4 indicated by broken-line arrows are generated in the same direction (that is, upward in FIG. 9). Moreover, in FIG. 9, the current distribution of copper foil 164 is symmetrical in the vertical and horizontal directions, so that the components of the magnetic fields in a central area inside copper foil 164 are canceled in the horizontal direction and the uniformity of the magnetic fields is improved in the central area.

Fifth Embodiment

Figure 10:
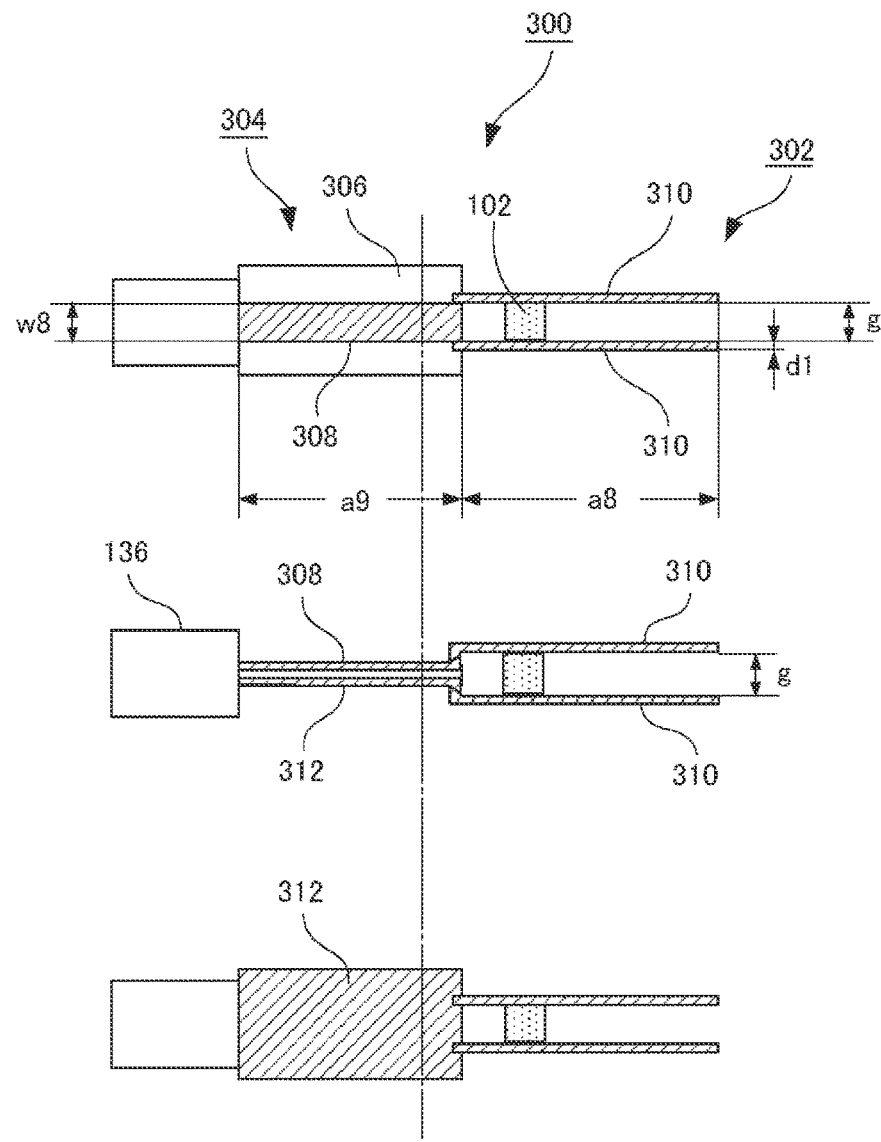
FIG. 10 is a three-view drawing (that is, a plan view, a side view, and a bottom view from the top) illustrating a specific example of a diamond magneto-optical sensor according to a fifth embodiment of the present disclosure.

In the foregoing description, as the second embodiment, the dielectric substrate made of glass epoxy or the like is used, and the λ/4 stub is formed from the two copper wires. In contrast, in a fifth embodiment, the flexible substrate is used, and a λ/4 stub is formed from four copper wires. Referring to FIG. 10, a diamond magneto-optical sensor 300 according to the fifth embodiment of the present disclosure includes a diamond 102, a λ/4 stub 302, λ/4 transformer 304, and a receptacle 136.

λ/4 stub 302 is formed from four copper wires 310. Four copper wires 310 constitute a λ/4 open stub. Each of copper wires 310 has a diameter d of 0.45 mm and a length a8 of about 20 mm such that/4 is obtained for microwaves at about 3 GHz. An interval g between copper wires 310 is 2 mm. Diamond 102 is disposed at the center of four copper wires 310.

λ/4 stub 302 includes a flexible substrate 306, copper foil 308 disposed on the front side of the flexible substrate 306, and copper foil 312 disposed on the back side of flexible substrate 306. Copper foil 308 has a width w8 of 1 mm and a length a9 of about 15 mm. The center line (that is, the signal line) of receptacle 136 is connected to copper foil 308 while the ground of receptacle 136 is connected to copper foil 312. λ/4 stub 302, which is a λ/4 open stub, has an impedance of, for example, 200Ω, and λ/4 transformer 304 has an impedance of, for example, 20Ω. In order to increase a magnetic field applied to diamond 102 by microwaves at the junction of λ/4 transformer 304 and λ/4 stub 302, the position of diamond 102 disposed on λ/4 stub 302 is preferably adjusted as in the second embodiment.

Figure 11:
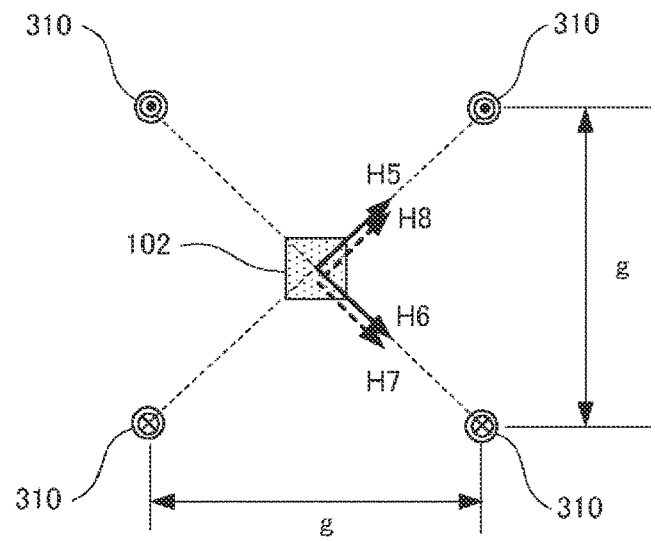
FIG. 11 is a cross-sectional view illustrating a magnetic field formed on a diamond by irradiation of microwaves in the diamond magneto-optical sensor of FIG. 10.

The intensity of microwaves formed on diamond 102 in diamond magneto-optical sensor 300 of FIG. 10 will be examined below. Referring to FIG. 11, in the configuration of FIG. 10, current passes through the upper two of four copper wires 310 (for example, the copper wires connected to copper foil 308) in the same direction, and current passes through the lower two of four copper wires 310 (for example, the copper wires connected to copper foil 312) in the same direction. The upper current direction and the lower current direction are opposite to each other. On diamond 102, magnetic fields H5 and H6 (see solid-line arrows) are formed by upper two copper wires 310 while magnetic fields H7 and H8 (see broken-line arrows) are formed by lower two copper wires 310. Magnetic fields H5 and H8 are formed in the same direction, that is, diagonally upward to the right in FIG. 11, so that the magnetic fields are intensified to each other. Magnetic fields H6 and H7 are formed in the same direction, that is, diagonally downward to the right in FIG. 11, so that the magnetic fields are intensified to each other.

Magnetic fields H5 to H8 form a rightward synthetic magnetic field. In other words, a magnetic field can be applied in parallel with the surface of flexible substrate 306. As described above, in the configurations of FIGS. 3 and 8, magnetic fields can be formed perpendicularly to the substrate (see FIGS. 5 and 9). The direction of a microwave magnetic field may be preferably vertical or horizontal depending upon the crystal orientation of diamond 102, the direction of an NV center, the orientation of the NV center, and a layout for the irradiation of excitation light and condensing of fluorescence. When the vertical direction is preferable, for example, the configuration illustrated in FIG. 3 or 8 is usable. When the horizontal direction is preferable, for example, the configuration illustrated in FIG. 10 is usable.

Figure 12:
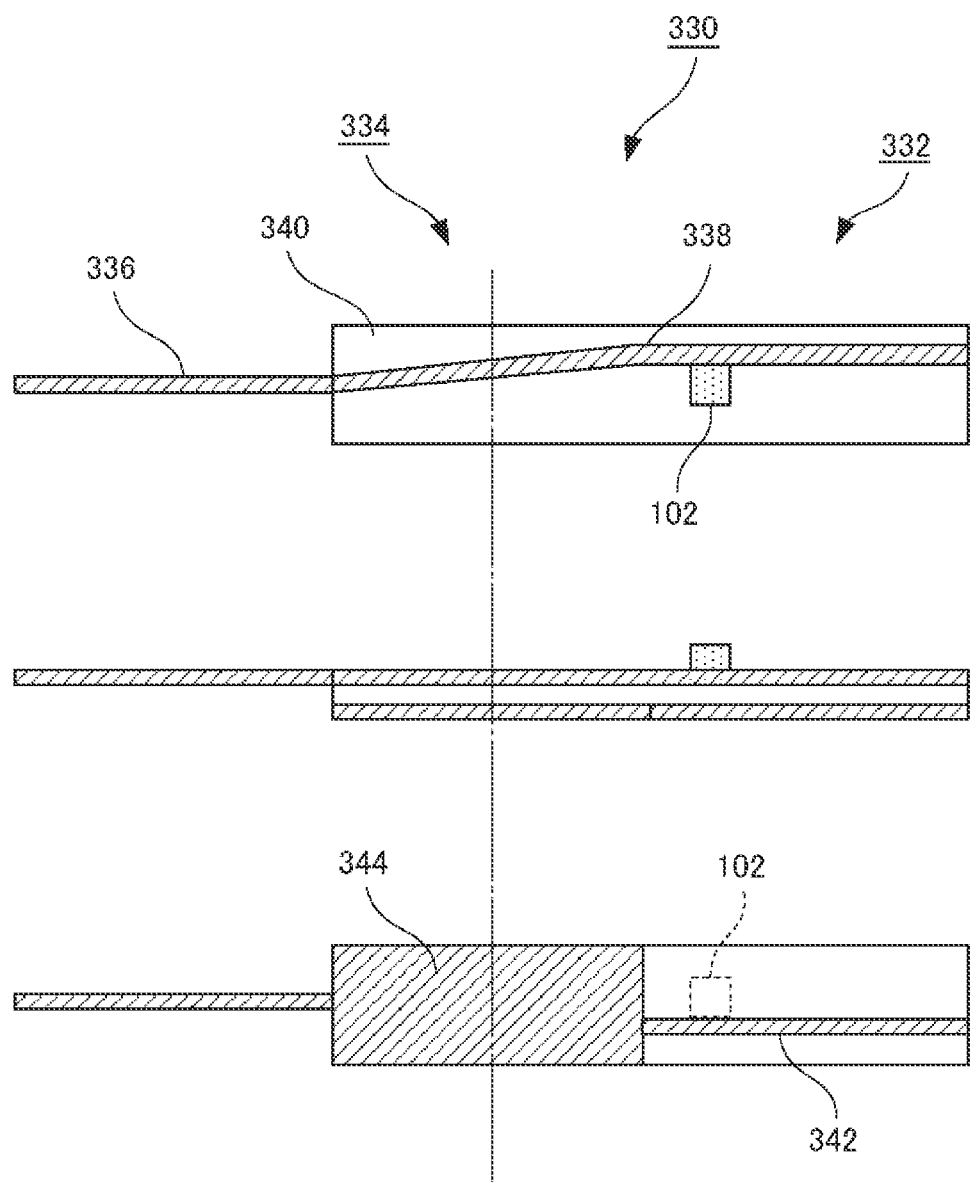
FIG. 12 is a three-view drawing (that is, a plan view, a side view, and a bottom view from the top) illustrating a diamond magneto-optical sensor when microwave power is supplied by radio transmission.

In the first to fifth embodiments, microwave power may be supplied via wire transmission or radio transmission in a space. In the foregoing example of wire transmission, the SMA receptacle is connected to the transmission circuit. In the case of radio transmission, for example, the transmission circuit can be configured as illustrated in FIG. 12 such that microwaves are received by a monopole antenna and power is supplied to the resonator side directly connected to the monopole antenna. Referring to FIG. 12, a diamond magneto-optical sensor 330 includes diamond 102, a λ/4 stub 332, a λ/4 transformer 334, and a monopole antenna 336. λ/4 stub 332 includes a linear conductor 342 (e.g., a copper wire) and a part (that is, a part corresponding to the linear conductor 342) of a linear conductor 338 (e.g., a copper wire). λ/4 stub 332 is a λ/4 open stub. λ/4 transformer 334 includes a flexible substrate 340, copper foil 344, and a part of linear conductor 338 (that is, a part facing copper foil 344). The characteristic impedances of monopole antenna 336 is, for example, 37Ω. The characteristic impedances of λ/4 transformer 334 and λ/4 stub 332 are, for example, 20Ω and 200Ω, respectively. In other words, microwaves are received by monopole antenna 336, are converted into a low impedance, and are placed in series resonance by the λ/4 open stub.

First Modification

In the foregoing description, the dielectric substrate (e.g., glass epoxy) is used as the second embodiment. The configuration is not limited thereto. For a diamond magneto-optical sensor according to a first modification, a flexible substrate is used.

Figure 13:
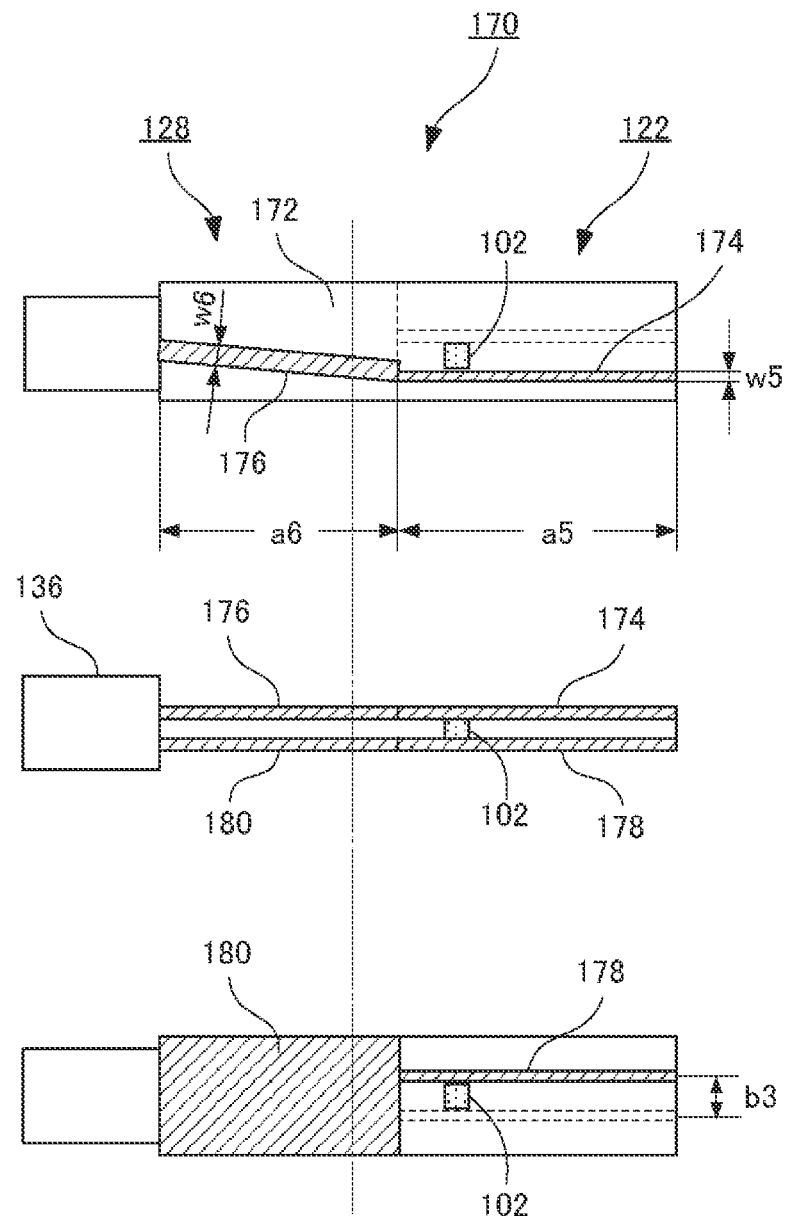
FIG. 13 is a three-view drawing (that is, a plan view, a side view, and a bottom view from the top) illustrating a diamond magneto-optical sensor according to a first modification.

Referring to FIG. 13, a diamond magneto-optical sensor 170 according to the first modification is different from diamond magneto-optical sensor 120 of FIG. 3 in the configurations of λ/4 stub 122 and λ/4 transformer 128. λ/4 stub 122 includes a flexible substrate 172, copper foil 174 disposed on the front side of flexible substrate 172, and copper foil 178 disposed on the back side of flexible substrate 172. Flexible substrate 172 is formed by using a polyimide film. Copper foil 174 and 178 have a width w5 of 0.5 mm and a length a5 of 20 mm, and an interval b3 therebetween is 4 mm. Copper foil 174 and copper foil 178 are λ/4 open stubs. λ/4 transformer 128 includes flexible substrate 172, copper foil 176 that is disposed on the front side of flexible substrate 172 and is connected to copper foil 174, and copper foil 180 that is disposed on the back side of flexible substrate 172 and is connected to copper foil 178.

Copper foil 176 has a width w6 of 1 mm and a length a6 of 15 mm. Flexible substrate 172 constituting both of λ/4 stub 122 and λ/4 transformer 128 has a length of 35 mm (that is, a5+a6). The center line (that is, the signal line) of receptacle 136, which is a SMA receptacle to which a coaxial cable is plugged, is connected to copper foil 176 while the ground of receptacle 136 is connected to copper foil 180. Diamond 102 is disposed in a space where flexible substrate 172 is removed between copper foil 174 and 178. The characteristic impedance of receptacle 136 is 50Ω. The characteristic impedances of λ/4 transformer 128 and λ/4 stub 122 are 20Ω and 200Ω respectively.

Diamond magneto-optical sensor 170 acts as a series resonant circuit like the configuration of FIG. 3 and can pass a short-circuit current larger than that of the prior art (see FIG. 4). Moreover, in diamond magneto-optical sensor 170, a magnetic field formed in diamond 102 can be larger than that of the prior art (see FIG. 4) as in the configuration of FIG. 5. Thus, even if the power of microwaves outputted from microwave source 110 is lower than that of the prior art, diamond magneto-optical sensor 170 is allowed to act as a magnetic sensor.

Second Modification

In the first modification, the linear copper foil is used as λ/4 stub 122. The configuration is not limited thereto. In a diamond magneto-optical sensor according to a second modification, flat-shaped copper foil is used as λ/4 stub 122.

Figure 14:
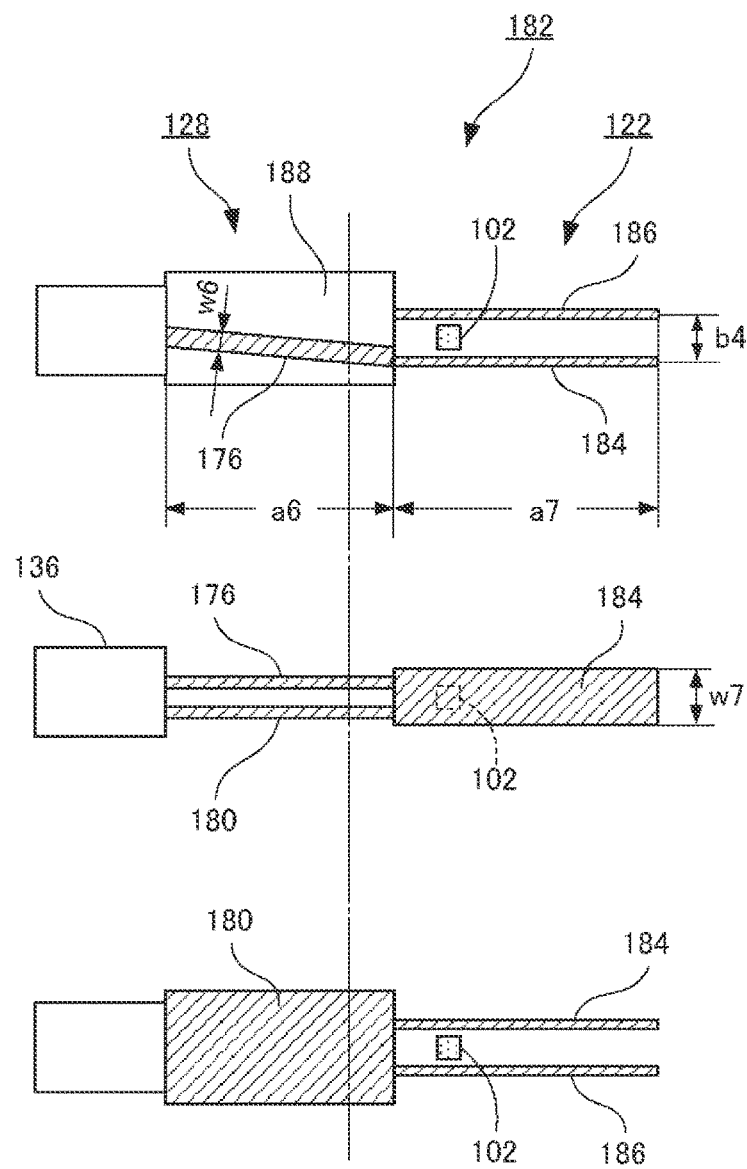
FIG. 14 is a three-view drawing (that is, a plan view, a side view, and a bottom view from the top) illustrating a diamond magneto-optical sensor according to a second modification.

Referring to FIG. 14, a diamond magneto-optical sensor 182 according to the second modification is different from diamond magneto-optical sensor 170 of FIG. 13 in the configuration of λ/4 stub 122. λ/4 stub 122 includes copper foil 184 and 186. Copper foil 184 and 186 have a width w7 of 4 mm and a length a7 of 20 mm, and an interval b4 therebetween is 4 mm. Copper foil 184 and 186 are λ/4 open stubs. A flexible substrate 188 is formed by using a polyimide film like diamond magneto-optical sensor 170. A length a6 (a6=15 (mm)) of flexible substrate 188 is shorter than the length (that is, a5+a6) of flexible substrate 172 of diamond magneto-optical sensor 170. Diamond 102 is disposed between copper foil 184 and 186. The characteristic impedance of receptacle 136 is 50Ω. The characteristic impedances of λ/4 transformer 128 and λ/4 stub 122 are 20Ω and 200Ω respectively.

Diamond magneto-optical sensor 182 acts as a series resonant circuit like the configuration of FIG. 3 and can pass a short-circuit current larger than that of the prior art (see FIG. 4). Moreover, in diamond magneto-optical sensor 182, a magnetic field formed in diamond 102 can be larger than that of the prior art (see FIG. 4) as in the configuration of FIG. 5. Thus, even if the power of microwaves outputted from microwave source 110 is lower than that of the prior art, diamond magneto-optical sensor 182 is allowed to act as a magnetic sensor.

Figure 15:
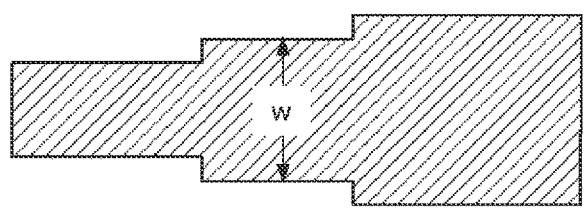
FIG. 15 is a schematic diagram illustrating a multi-stage $\lambda/4$ transformer.
Figure 16:
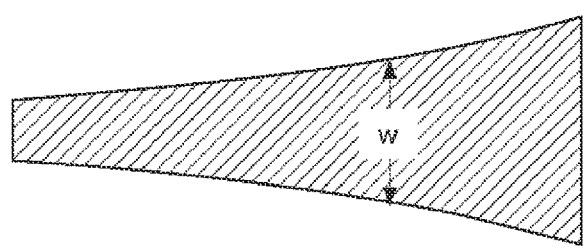
FIG. 16 is a schematic diagram illustrating a tapered $\lambda/4$ transformer.

In the foregoing description, λ/4 transformer 128 is formed by using a λ/4 stub (that is, copper foil) having predetermined width w2. The configuration is not limited thereto. Width w of the λ/4 transformer may gradually change as illustrated in FIG. 15, or width w of the λ/4 transformer may smoothly change in a tapering manner as illustrated in FIG. 16. Thus, even if the power of microwaves outputted from microwave source 110 is lower than that of the prior art, as described above, the diamond magneto-optical sensor composed of λ/4 transformer 128 in FIG. 3 is allowed to act as a magnetic sensor.

In the foregoing description, the impedance converter is a transformer or a λ/4 transformer. The configuration is not limited thereto. A microstrip line may be used for the impedance converter. The width of the microstrip line is preferably half or less of the length of the microstrip line. By using a microstrip line for the impedance converter, an impedance can be easily and accurately converted between the microwave source and the irradiation unit of microwaves.

In the foregoing description, the diamond magneto-optical sensor includes the NV center. The configuration is not limited thereto. The diamond magneto-optical sensor only needs to include a color center with an electronic spin. The color center with the electronic spin is a center that forms a spin triplet state and is illuminated by excitation. A typical example is the color center is an NV center. Additionally, it is known that a color center with an electronic spin is also present in a silicon-vacancy center (that is, Si-V center), a germanium-vacancy center (that is, Ge-V center), and a tin-vacancy center (that is, Sn-V center). Thus, the diamond magneto-optical sensor may be formed by using diamonds including such centers instead of a diamond including an NV center.

Example 1

Figure 17:
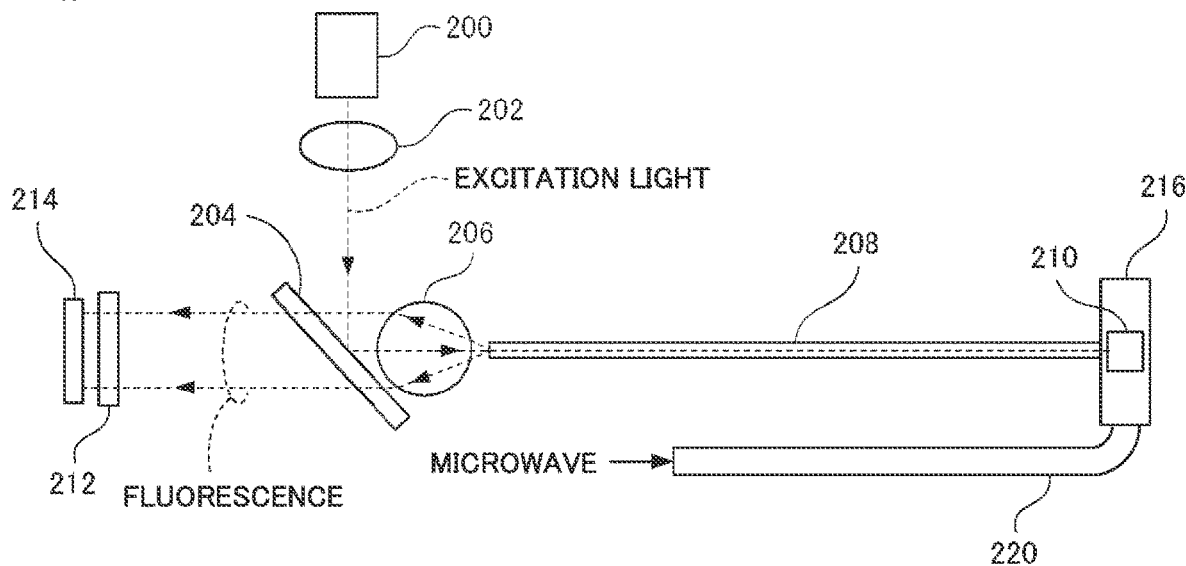
FIG. 17 is a schematic diagram illustrating the configuration of a measuring device used for experiments.

The effectiveness of the present disclosure will be described below according to examples. By using a measuring device configured as illustrated in FIG. 17, the diamond including the NV center was irradiated with excitation light, and the intensity of fluorescence radiated from the NV center was measured. Referring to FIG. 17, in the measuring device, a configuration for irradiating a diamond 210 included in a diamond magneto-optical sensor 216 with excitation light (that is, an irradiation system) includes a light source 200, a collimate lens 202, a dichroic mirror 204, a sphere lens 206, and an optical fiber 208. A configuration for observing fluorescence emitted from diamond 210 (that is, an observation system) includes optical fiber 208, sphere lens 206, dichroic mirror 204, an LPF (Long Pass Filter) 212, and a photodetector 214. A configuration for irradiating diamond 210 with microwaves (that is, a microwave system) includes a microwave source (not illustrated) and a coaxial cable 220. Microwaves transmitted through coaxial cable 220 is shared by a resonator constituting diamond magneto-optical sensor 216.

For light source 200 for generating excitation light, an LD (laser diode) element (specifically, L515A1 of Thorlabs, Inc.) was used, and a green laser beam (that is, excitation light) of 5 mW was generated. Excitation light outputted from light source 200 was condensed through collimate lens 202 and then was emitted to dichroic mirror 204. For collimate lens 202, LA/116-A of Thorlabs, Inc. was used. For dichroic mirror 204, S06-RG of SURUGA SEIKI Co., Ltd. was used. Excitation light (that is, green light) incident on dichroic mirror 204 is reflected by dichroic mirror 204. The reflected light was condensed through sphere lens 206, was caused to enter optical fiber 208 (specifically, the core), was transmitted through optical fiber 208, and then was emitted to diamond 210. For sphere lens 206, MS-08-4.35P1 (8 mm in diameter) of OptoSigma Corporation was used. For optical fiber 208, an optical digital cable having a core diameter φ of 0.9 mm was used.

In fluorescence emitted from diamond 210, fluorescence having entered optical fiber 208 is propagated through optical fiber 208, is transformed into parallel rays through sphere lens 206, and then is emitted to dichroic mirror 204. Fluorescence (that is, red light) incident on dichroic mirror 204 passes through dichroic mirror 204 and enters LPF 212. Fluorescence having passed through LPF 212 was detected by photodetector 214. LPF 212 allows the passage of light at a predetermined wavelength or longer and cuts (e.g., reflects) light at a wavelength shorter than the predetermined wavelength. For LPF 212, LOPF-25C-593 of OptoSigma Corporation was used. For photodetector 214, a photodiode (specifically, S6967 of Hamamatsu Photonics K.K.) was used. Emitted light of the diamond is red light passing through LPF 212, whereas excitation light having a shorter wavelength than red light does not pass through LPF 212. Thus, excitation light emitted from light source 200 was detected as noise by photodetector 214, thereby suppressing a reduction in the sensitivity of detection.

Figure 18:
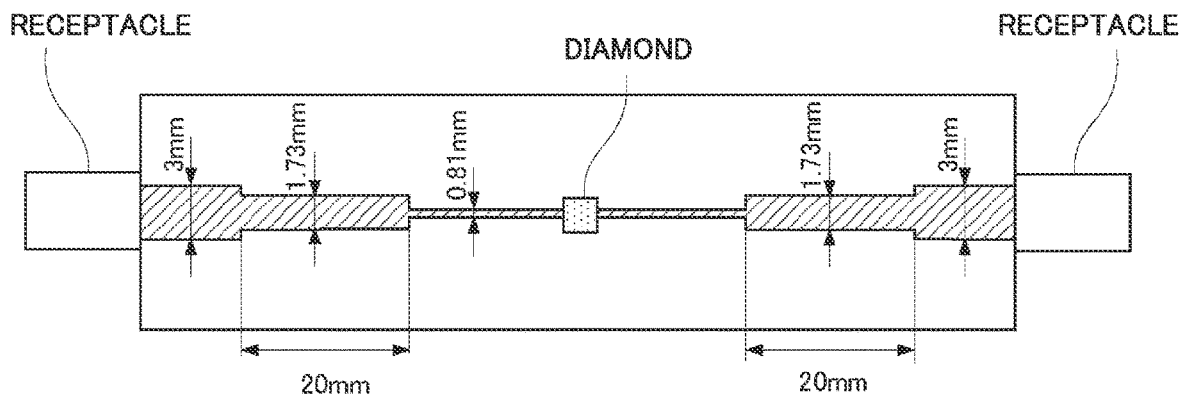
FIG. 18 is a plan view illustrating a resonator of a microstrip line used for experiments.
Figure 19:
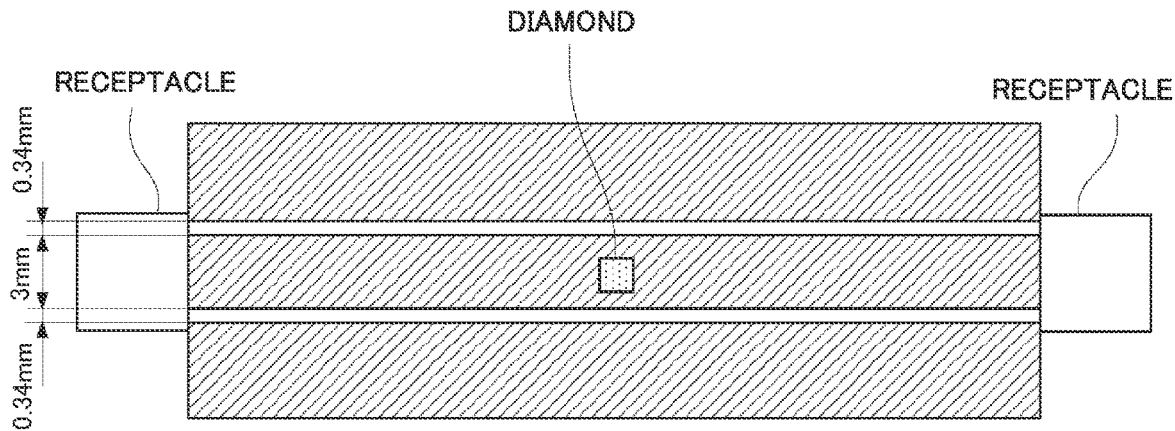
FIG. 19 is a plan view illustrating a resonator of a coplanar waveguide used for experiments.

The resonator of diamond magneto-optical sensor 120 in FIG. 3, the resonator of diamond magneto-optical sensor 150 in FIG. 8, and the resonator of diamond magneto-optical sensor 300 in FIG. 10 were used as the resonator of diamond magneto-optical sensor 216. The configurations and dimensions were set as in the foregoing description. Used as comparative examples were the resonator of a microstrip line that was configured and sized as illustrated in FIG. 18 and the resonator of a coplanar waveguide that was configured and sized as illustrated in FIG. 19. In FIG. 18, an electric conductor acting as the ground is disposed over the back side of a dielectric substrate where the microstrip line is disposed. The diamond was a cubic diamond disposed at positions in FIGS. 18 and 19 as will be described later. Microwaves were supplied while the plug (not illustrated in FIG. 17) of coaxial cable 220 was attached to the receptacle of each of the resonators (see FIGS. 3, 8, 10, 18, and 19). In the resonators of FIGS. 18 and 19, the receptacle unconnected with coaxial cable 220 was terminated with a terminating resistance of 50Ω.

Measurements were conducted by using the same diamond according to the configuration of the present disclosure and the configuration of the comparative example. Specifically, a diamond of type Ib was used. Electrons were injected into the diamond with an electron acceleration energy of 3 MeV and an electron dose of $3 \times 10^{18}/cm^2$, and then the diamond was annealed at 800° C. for about one hour, so that the diamond including an NV center was generated. The diamond was cut into a cube with a side of 1 mm to produce diamond 210 used for measurement.

Figure 20:
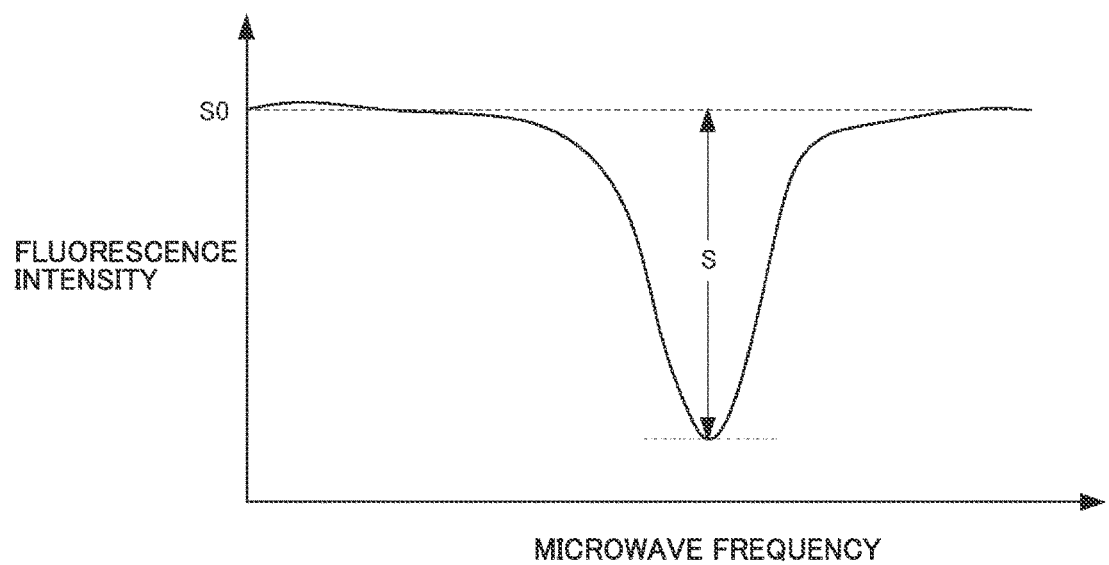
FIG. 20 is a graph showing fluctuations in the intensity of fluorescence radiated from the NV center of the diamond.

Microwaves (1W) generated by a microwave generator (not illustrated) were transmitted to diamond magneto-optical sensor 216 by using coaxial cable 220. For coaxial cable 220, a coaxial cable with a characteristic impedance of 50Ω was used. The power of microwaves supplied to coaxial cable 220 was changed in a range of −16 dBm to 30 dBm. Moreover, the frequency of microwaves was changed in a range of 2.74 GHz to 2.94 GHz. When the frequency of microwaves is changed with the constant power of microwaves, as shown in FIG. 20, a valley of the intensity of red fluorescence radiated from the NV center of the diamond can be observed. Thus, a spin detection contrast ratio as a decrease rate of red light brightness (that is, a value determined by dividing a valley depth S of the graph by fluorescence intensity S0) can be calculated. As a theoretical formula of sensitivity δB (that is, the resolution of a detected magnetic field B) of the diamond magneto-optical sensor, Formula 1 expressed below is known. The spin detection contrast ratio affects the sensitivity δB.

[Formula 1]

$$\delta B \sim \frac{1}{\gamma\sqrt{\eta}} \frac{1}{C} \frac{1}{\sqrt{NT_2}} (T/\sqrt{Hz})$$ (Formula 1)

In Formula 1, γ is a gyromagnetic ratio (that is, a constant) that is a value close to the gyromagnetic ratio of an electron ($1.76 \times 10^{11}$ rad/s/T). η is the detection efficiency of fluorescence, and C is a spin detection contrast ratio. N is the number of NV centers that are irradiated with excitation light and carry negative electrical charge in an area where fluorescence is condensed. $T_2$ is a transverse relaxation time of an electronic spin. According to the theoretical formula of sensitivity (Formula 1), the sensitivity δB decreases as the spin contrast ratio increases, resulting in higher sensitivity.

Figure 21:
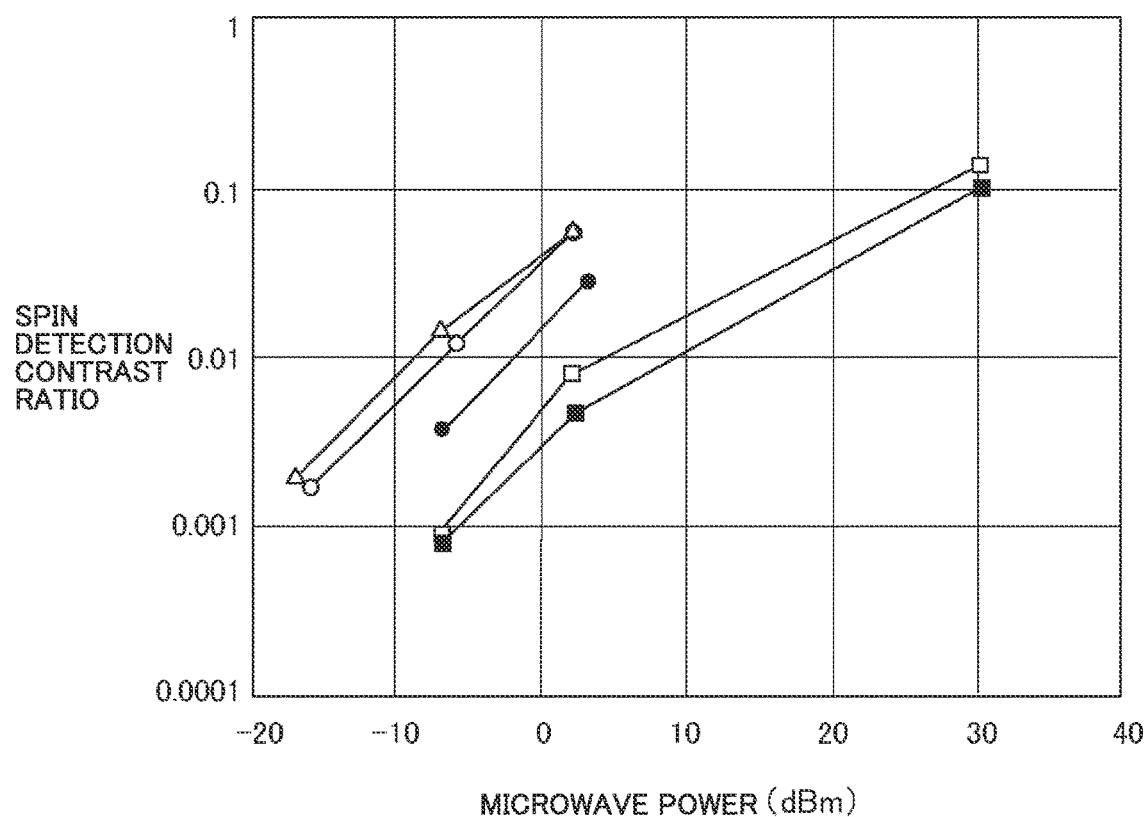
FIG. 21 is a graph showing experimental results.

For the five resonators (see FIGS. 3, 8, 10, 18, and 19), the power of microwaves was changed as described above; meanwhile, a valley of fluorescence intensity (that is, red light brightness) was observed and a spin detection contrast ratio was calculated. The results are shown in FIG. 21. In FIG. 21, white circles indicate the result of using the resonator of the λ/4 open stub illustrated in FIG. 3. Black circles indicate the result of using the resonator of the λ/4 short stub illustrated in FIG. 8. White triangles indicate the result of using the resonator of the λ/4 open stub illustrated in FIG. 10. White squares indicate the result of using the resonator of the microstrip line illustrated in FIG. 18. Black squares indicate the result of using the resonator of the coplanar waveguide illustrated in FIG. 19.

As is understood from FIG. 21, by using the resonator of the λ/4 open stub (see FIG. 3), the same spin detection contrast ratio was obtained with microwaves of lower power than those of the comparative examples (see FIGS. 18 and 19) by about 25 dB (that is, one three-hundredth of power). By using the resonator of the λ/4 short stub (see FIG. 8), the same spin detection contrast ratio was obtained with microwaves of lower power than those of the comparative examples by about 10 dB (that is, one tenth of power). By using the resonator of the λ/4 open stub including the four copper wires in parallel (see FIG. 10), the same spin detection contrast ratio was obtained with microwaves of lower power than the resonator of the λ/4 open stub including the two copper wires in parallel (see FIG. 3) by further about 2 dBm. Hence, even if microwaves are used with considerably lower power than that of the prior art, the diamond magneto-optical sensor is allowed to function by using the resonator of the present disclosure.

Example 2

By using the configuration of the second embodiment (see FIG. 3), the same experiment was conducted as in Example 1 (see FIG. 17) after the diameters of copper wires 132 and 134 constituting the λ/4 stub were changed and the diamond was resized. Specifically, copper wires having diameters of 0.1 mm, 0.3 mm, 1.0 mm, and 1.5 mm were used as copper wires 132 and 134. As comparative examples, copper wires having diameters of 0.02 mm and 3 mm were used as copper wires 132 and 134. Diamonds having thicknesses of 0.8 μm, 10 μm, 0.1 mm, 0.3 mm, and 0.5 mm were used as diamond 210 (see FIG. 17).

When the copper wires having diameters of 0.1 mm, 0.3 mm, 1.0 mm, and 1.5 mm were used, the same result as in Example 1 was obtained. Specifically, a spin detection contrast ratio was obtained as the result of the white circles (that is, copper wires 132 and 134 having a diameter of 0.45 mm) in FIG. 21. When copper wires having a diameter of 0.02 mm were used as copper wires 132 and 134, the temperatures of the copper wires rose and the resistance value increased. In the case of high output of microwaves, the copper wires were broken when the temperature increase was left. If copper wires having a diameter of 3 mm was used as copper wires 132 and 134, the excessively large thickness interfered with matching of resonance, so that the spin detection contrast ratio decreased to 0.001 or less.

Regarding samples of diamond 210 (FIG. 17) with thicknesses of 10 μm and 0.1 mm, the same result as Example 1, that is, the same spin detection contrast ratio was obtained as the result indicated by the white circles in FIG. 21. Regarding a sample of diamond 210 with a thickness of 0.8 μm, the intensity of fluorescence decreased and resulted in the difficulty of detecting light. A sample of diamond 210 with a thickness of 0.5 mm had a spin detection contrast ratio that decreased to one tenth or less as compared with a sample having thickness of 0.3 mm.

The present disclosure was described according to the description of the embodiments. The embodiments were merely exemplary and the present disclosure is not limited to the embodiments. The scope of the present disclosure is indicated by the claims in consideration of the detailed description of the invention. The scope of the present disclosure includes meanings equivalent to the language of the claims and all changes in the scope.

REFERENCE SIGNS LIST 100, 120, 142, 150, 170, 182, 216, 300, 330 Diamond magneto-optical sensor
102, 210 Diamond
104, 124, 144, 154 Resonator
106, 126, 146, 156 Transmission circuit
108, 148 Impedance converter
110 Microwave source
122, 152, 302, 332 λ/4 stub
128, 158, 304, 334 λ/4 transformer
130, 138, 164, 174, 176, 178, 180, 184, 186, 308, 312, 344 Copper foil
132, 134, 160, 162, 310 Copper wire
136 Receptacle
140 Dielectric substrate
172, 188, 306, 340 Flexible substrate
200 Light source
202 Collimate lens
204 Dichroic mirror
206 Sphere lens
208 Optical fiber
212 LPF
214 Photodetector
220 Coaxial cable
336 Monopole antenna
338, 342 Linear conductor
900, 902, 904 Electric conductor
a1, a2, a3, a4, a5, a6, a7, a8, a9 Length
b1, b2, b3, b4, g Interval
C1, C2 Capacitor
d, d1 Diameter
e1, e2 Distance
H1, H2, H3, H4, H5, H6, H7, H8 Magnetic field
L1, L2 Coil
w1, w2, w4, w5, w6, w7, w8 Width
Z1 Impedance

The invention claimed is:

1. A diamond magneto-optical sensor comprising:
   a diamond including a color center with an electronic spin;
   a transmission circuit configured to transmits electromagnetic waves, and
   an irradiation unit configured to irradiates the diamond with the electromagnetic waves transmitted by the transmission circuit,
   wherein the irradiation unit includes a resonator, and
   wherein the resonator includes two linear electric conductors arranged in parallel.

2. A diamond magneto-optical sensor according to claim 1, wherein the transmission circuit includes an impedance converter that reduces or increases, with respect to the irradiation unit, an impedance of an electromagnetic source for outputting the electromagnetic waves.

3. The diamond magneto-optical sensor according to claim 1, wherein the impedance converter includes a transformer.

4. The diamond magneto-optical sensor according to claim 1, wherein the impedance converter includes a λ/4 transformer.

5. The diamond magneto-optical sensor according to claim 1, wherein the resonator includes a λ/4 stub.

6. The diamond magneto-optical sensor according to claim 5, wherein the λ/4 stub includes a λ/4 open stub.

7. The diamond magneto-optical sensor according to claim 5, wherein the λ/4 stub includes a λ/4 short stub.

8. The diamond magneto-optical sensor according to claim 5, wherein the λ/4 stub includes four linear electric conductors arranged in parallel.

9. A diamond magneto-optical sensor comprising:
   a diamond including a color center with an electronic spin;
   a transmission circuit configured to transmit electromagnetic waves, and
   an irradiation unit configured to irradiate the diamond with the electromagnetic waves transmitted by the transmission circuit,
   wherein the irradiation unit includes a resonator, and
   wherein the resonator includes two flat-shaped electric conductors opposed to each other in parallel.

10. The diamond magneto-optical sensor according to claim 5, wherein the diamond is larger than 0 and 0.3 mm or less in thickness, and
    the two linear electric conductors are separated from each other in a thickness direction of the diamond interposed between the electric conductors.

11. The diamond magneto-optical sensor according to claim 9, wherein the diamond is 0.5 mm or more and 3 mm or less in thickness, and
    the two flat-shaped electric conductors are separated from each other in a thickness direction of the diamond interposed between the electric conductors.

12. The diamond magneto-optical sensor according to claim 4, wherein the λ/4 transformer is tapered with a continuously changing width.

13. The diamond magneto-optical sensor according to claim 4, wherein the λ/4 transformer is formed as a multi-stage transformer with a discretely changing width.

14. The diamond magneto-optical sensor according to claim 4, wherein the impedance converter includes a microstrip line, and
    a width of the microstrip line is half or less of a length of the microstrip line.

15. The diamond magneto-optical sensor according to claim 5, wherein a width of the λ/4 stub is half or less of a length of the λ/4 stub.

16. The diamond magneto-optical sensor according to claim 6, wherein the diamond has a center located in a predetermine range from a connecting end of the λ/4 open stub with the transmission circuit,
    the predetermined range is one eighth or more and three eighths or less of an electrical length of the λ/4 open stub, and
    a length of the diamond is one fourth or less of the electrical length along a longitudinal direction of the λ/4 open stub.

17. The diamond magneto-optical sensor according to claim 7, wherein the diamond has a center located in a predetermine range from a short-circuited end of the λ/4 short stub,
    the predetermined range is one eighth or more and three eighths or less of an electrical length of the λ/4 short stub, and
    a length of the diamond is one fourth or less of the electrical length along a longitudinal direction of the λ/4 short stub.

18. A diamond magneto-optical sensor comprising:
    a diamond including a color center with an electronic spin;
    a transmission circuit configured to transmit electromagnetic waves, and
    an irradiation unit configured to irradiate the diamond with the electromagnetic waves transmitted by the transmission circuit,
    wherein the irradiation unit includes a resonator,
    wherein the resonator includes a λ/4 stub,
    wherein the diamond has a center located in a predetermined range from an end of the λ/4 stub, and
    wherein the predetermined range is one eighth or more and three eighths or less of an electrical length of the λ/4 stub.

* * * * *